(12) United States Patent
Shepherd

(10) Patent No.: US 6,422,871 B2
(45) Date of Patent: Jul. 23, 2002

(54) EDUCATIONAL SYSTEM, METHOD AND DOLL FOR TEACHING INDIVIDUALS THEIR EMOTIONS EMPLOYING SETS OF FACES EXPRESSING DIFFERENT EMOTIONS WITH PLURAL STATES

(76) Inventor: Kimberly A. Shepherd, 608 Sheridan Ave., Laramie, WY (US) 82070

(*) Notice: Subject to any disclaimer, the term of this patent is extended or adjusted under 35 U.S.C. 154(b) by 0 days.

(21) Appl. No.: 09/849,627

(22) Filed: May 4, 2001

Related U.S. Application Data

(62) Division of application No. 09/479,741, filed on Jan. 7, 2000.
(60) Provisional application No. 60/115,359, filed on Jan. 8, 1999.

(51) Int. Cl.[7] .......................... G09B 19/00; A63H 13/10
(52) U.S. Cl. ....................... 434/236; 446/308; 446/309; 446/376; 446/384; 446/390
(58) Field of Search ................................ 446/308, 309, 446/311, 312, 317, 330, 333, 334, 336, 376, 381–384, 390, 391, 901; 434/236, 237, 393

(56) References Cited

U.S. PATENT DOCUMENTS

| | | | |
|---|---|---|---|
| 447,034 A | * | 2/1891 | Pulvermacher |
| 526,667 A | * | 9/1894 | Schultz |
| 631,626 A | * | 8/1899 | Edwards |
| 1,050,793 A | * | 1/1913 | Beedle |
| 1,136,482 A | * | 4/1915 | Parsons |
| 1,452,820 A | * | 4/1923 | Whitcomb et al. |
| 3,811,220 A | | 5/1974 | Glass et al. ............... 46/135 R |
| 4,013,294 A | | 3/1977 | Smeda et al. ........... 273/134 B |
| 4,122,628 A | | 10/1978 | Cromwell et al. ........ 46/135 R |
| 4,573,927 A | | 3/1986 | Newman ................... 434/236 |
| 4,637,798 A | | 1/1987 | Maiden-Nesset ............ 434/191 |
| 4,710,145 A | | 12/1987 | Hall Vandis ................. 446/100 |
| 4,762,494 A | | 8/1988 | Woods ........................ 434/236 |
| 4,798,556 A | | 1/1989 | Vicars et al. ................ 446/391 |
| 4,917,607 A | | 4/1990 | Van Hoose ................. 434/236 |

* cited by examiner

*Primary Examiner*—Jacob K. Ackun
*Assistant Examiner*—Bena B. Miller
(74) *Attorney, Agent, or Firm*—Flanagan & Flanagan; John R. Flanagan

(57) ABSTRACT

An educational system for teaching individuals their emotions employs a multiplicity of sets of faces. Each set of faces expresses a different emotion experienced by individuals from time to time. The sets of faces have facial expressions correlated to the different emotions. There are a plurality of states of the particular emotion that are expressed in the facial expressions of each set of faces. The states defined for each of the different emotions are subdued, normal and exaggerated states. The facial expressions on the faces employ certain facial features to express the particular emotions, namely, eyes, eyebrows, a mouth and a nose. These facial features are enclosed in a facial circle. The sizes of these facial features relative to the facial circle change from one state of a particular emotion to another and are smallest in the subdued state, largest in the exaggerated state and inbetween and balanced in the normal state. In an educational method for teaching individuals their emotions, selected ones of the faces of the sets thereof are employed in learning, building and de-building sequences and combinations thereof to assist and guide individuals in understanding, expressing and modifying their emotions. An educational doll provides one substrate to which selected ones of the faces can be applied. The doll has limbs with fan folded sections on which objects, such as faces, can be placed and also has swivels so that the doll can dance or turn allowing a child to have fun while learning his or her emotions.

16 Claims, 10 Drawing Sheets

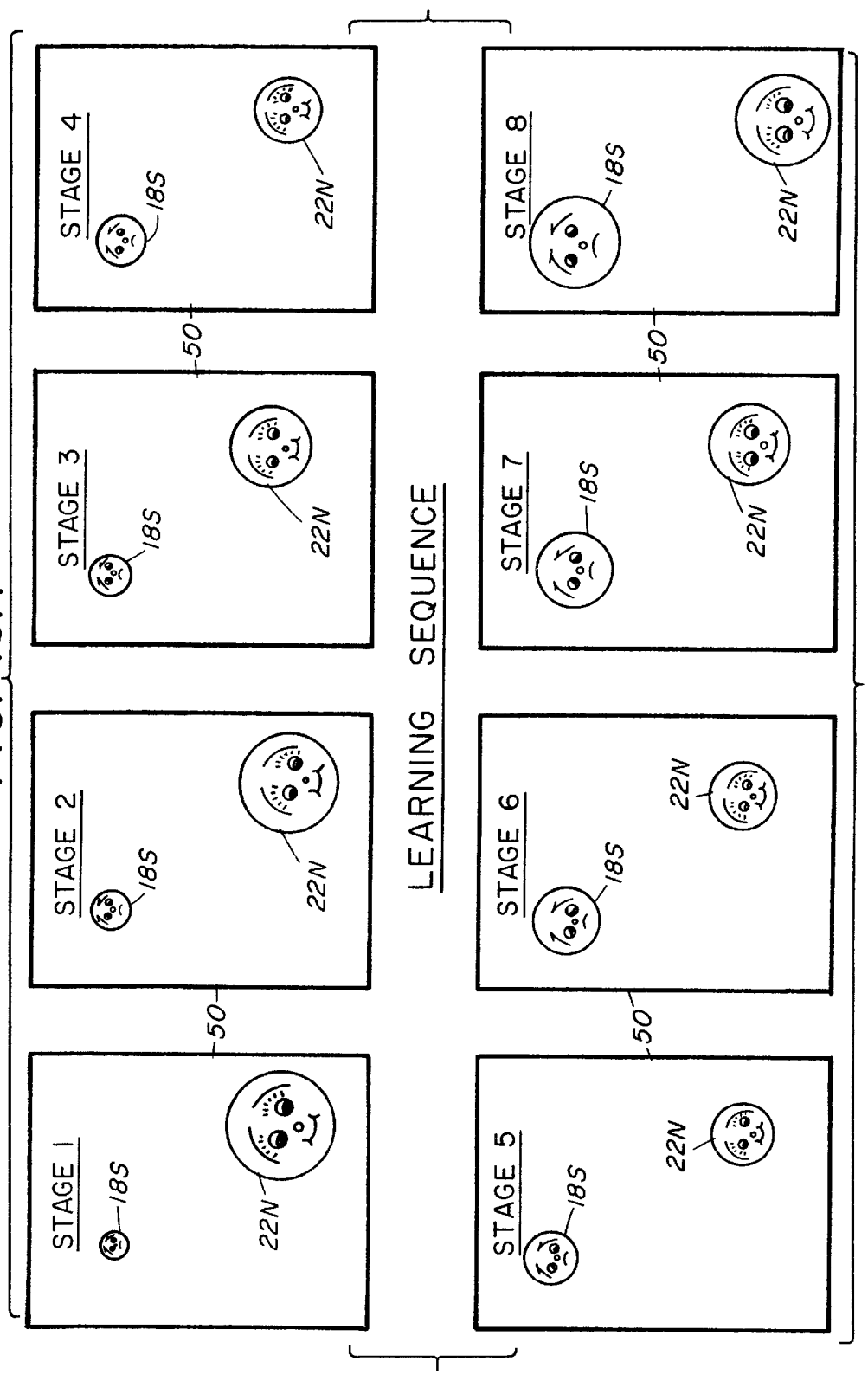

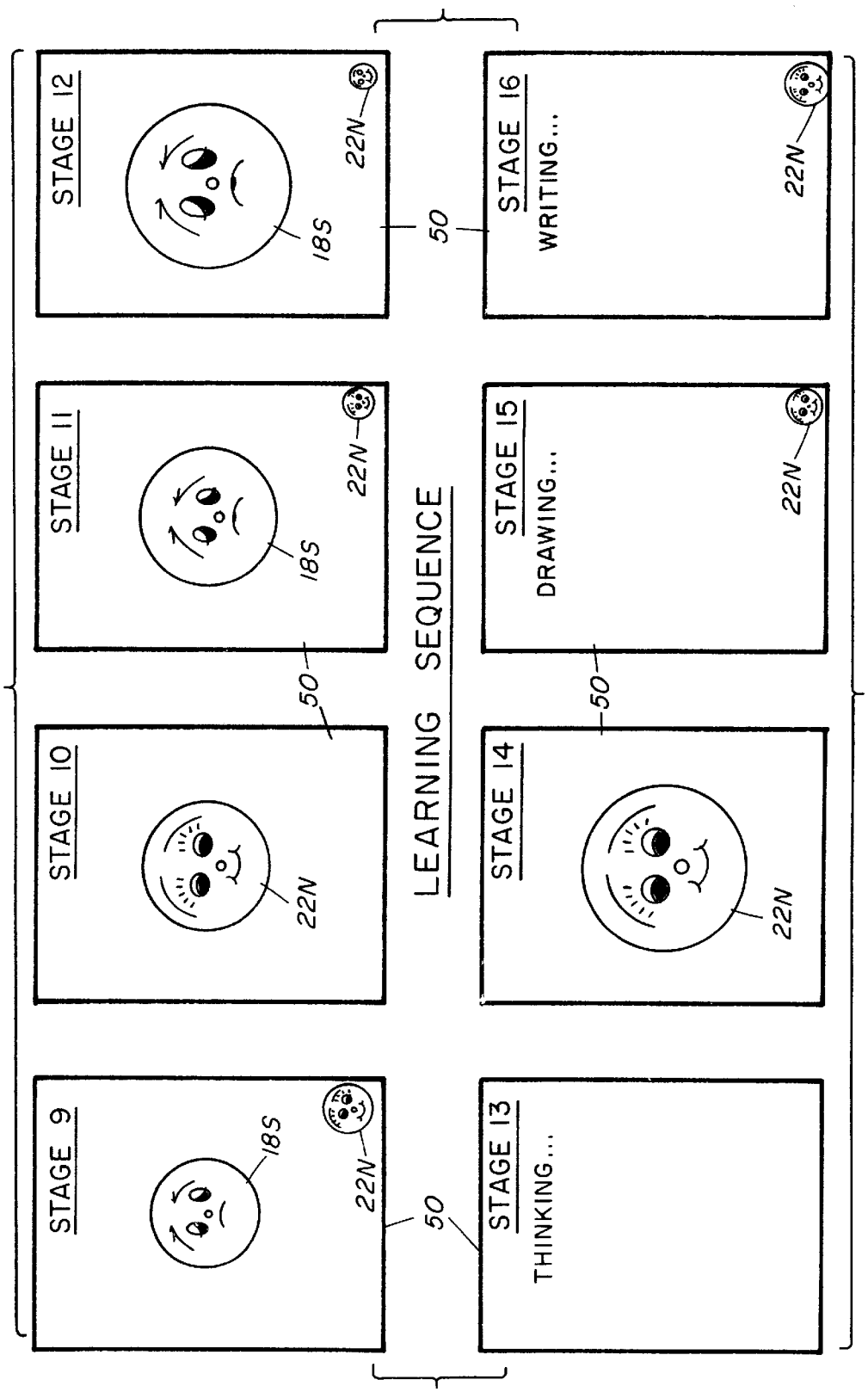

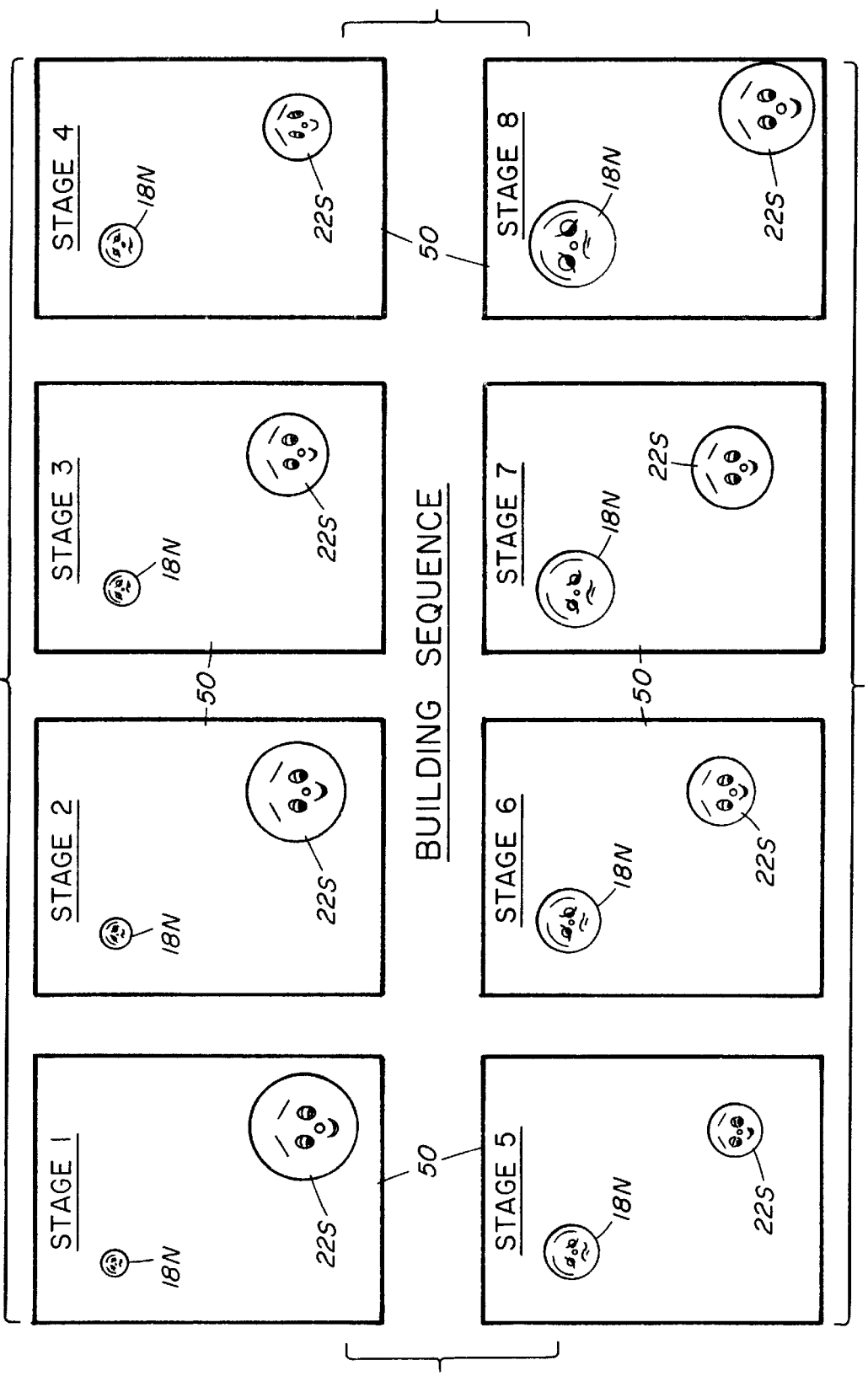

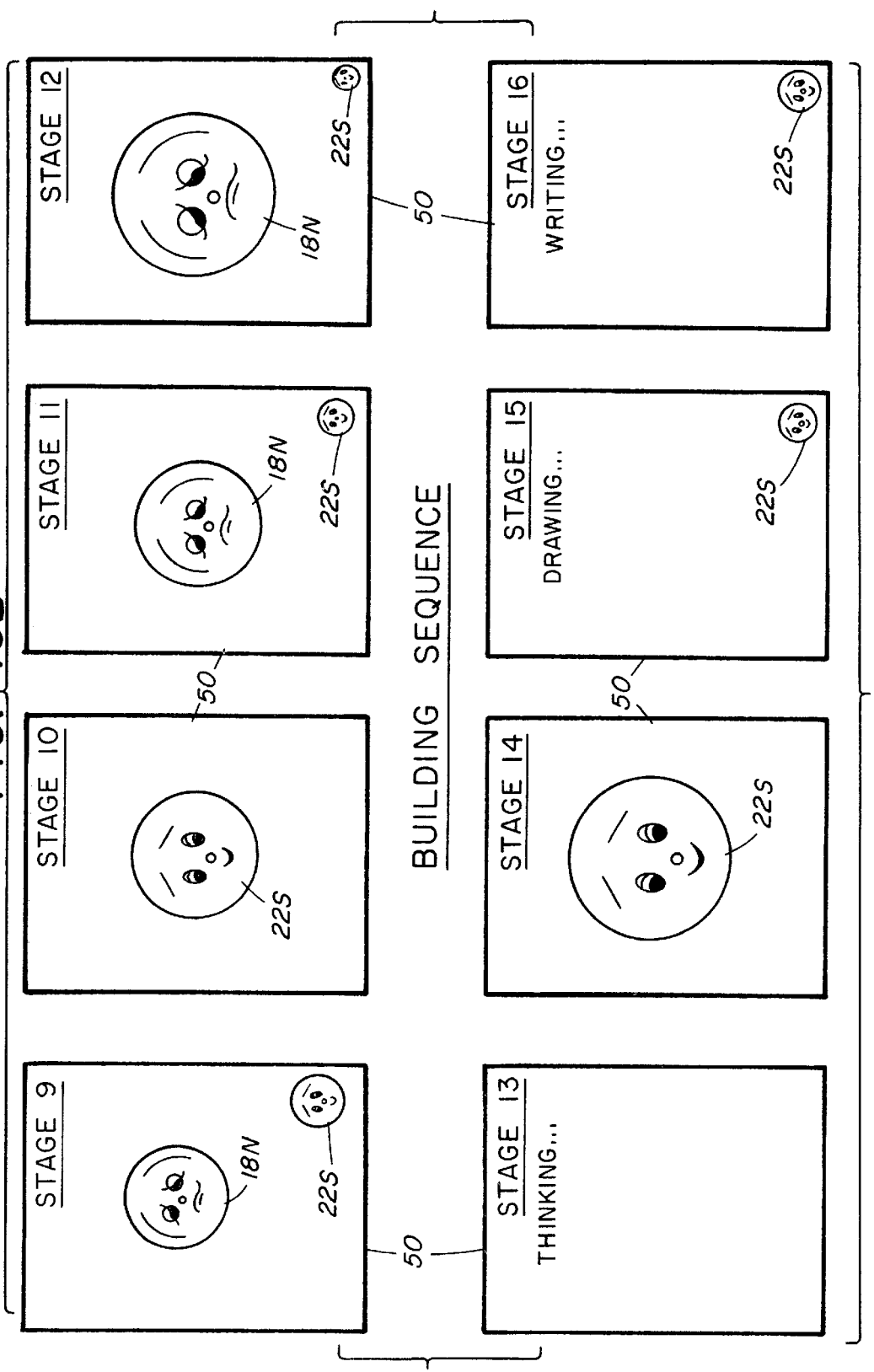

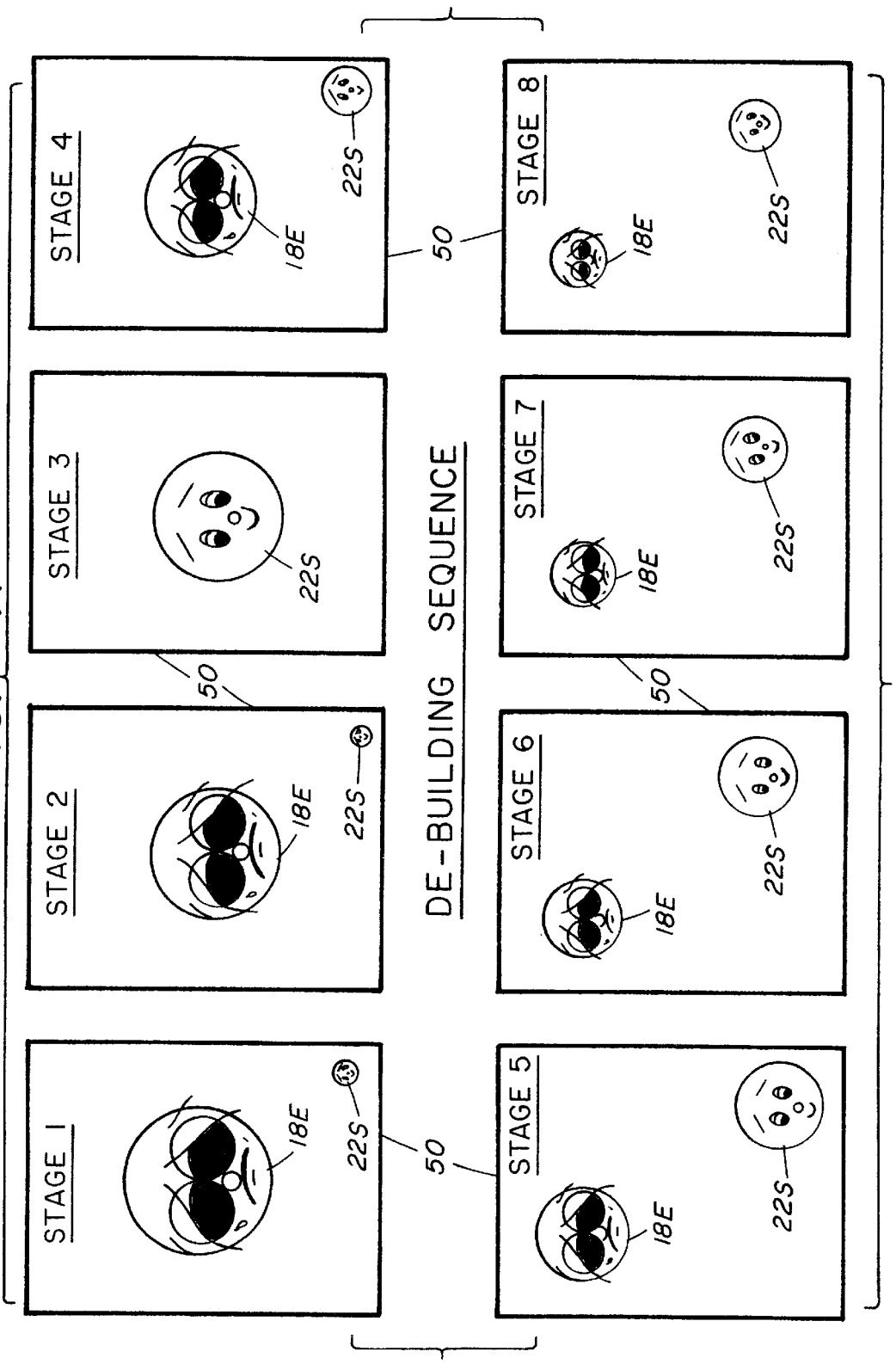

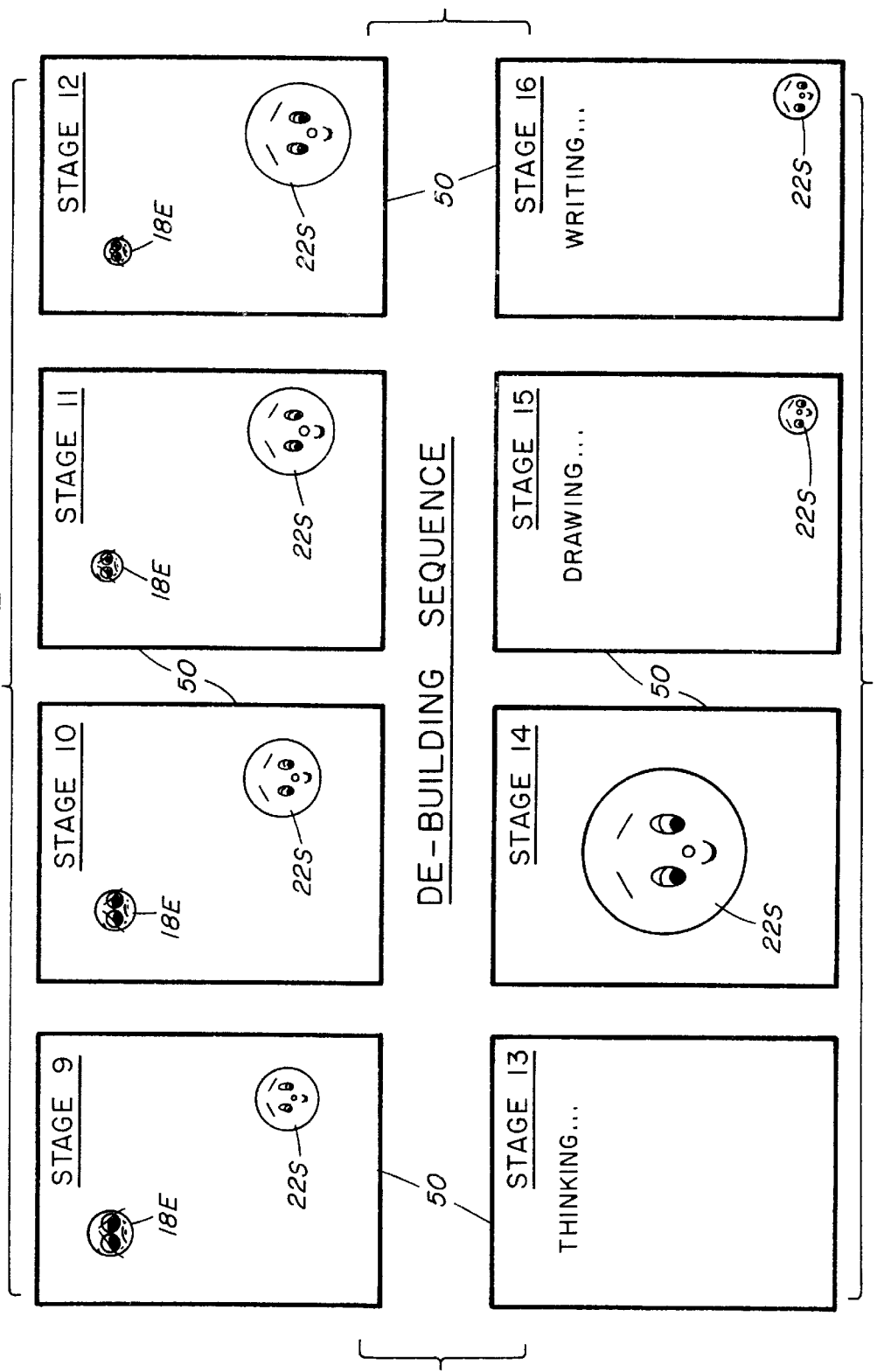

EDUCATIONAL SYSTEM, METHOD AND DOLL FOR TEACHING INDIVIDUALS THEIR EMOTIONS EMPLOYING SETS OF FACES EXPRESSING DIFFERENT EMOTIONS WITH PLURAL STATES

This patent application is a division of copending application Ser. No. 09/479,741 filed Jan. 7, 2000 and through said application also claims the benefit of U.S. provisional patent application No. 60/115,359 filed on Jan. 8, 1999.

BACKGROUND OF THE INVENTION

1. Field of the Invention

The present invention generally relates to techniques for helping individuals emotionally so as to improve their learning capability and, more particularly, is concerned with an educational system, method and doll for teaching individuals their emotions employing sets of faces expressing different emotions with plural states.

2. Description of the Prior Art

There are basically four balances or equilibriums to be maintained in every person to enhance his or her learning capability for productive human growth and development. These equilibriums are a person's medical, physical, emotional and intellectual well-being. When only one is unbalanced or in disequilibrium, it can have a disruptive influence on learning capability and potential.

An individual's emotional equilibrium has proven to be one of the most difficult to teach about and restore, especially in the case of children. Children have particular difficulty expressing and dealing with negative thoughts and feelings which they often equate with being "bad" and for which they feel guilt. One approach to helping children express emotions is disclosed in U.S. Pat. No. 4,573,927 to Newman. The Newman patent discloses four facial panels for a doll-like figure which a child can interchange. Three of the four facial panels depict negative emotions of anger, sadness and fear. The fourth panel depicts the positive emotion of happiness. The doll-like figure provides the child with a non-threatening object to either identify with or to use to display observed feelings without feeling guilty of being "bad".

While the approach of the Newman patent appears to be a step in the right direction, its identification of only four emotions and provision of only four facial panels to address these emotions is believed to be an over-simplification of the emotions involved and an inadequate solution for overcoming these kinds of difficulties faced by children. Further, the Newman patent provides substantial uniformity in size of each of the same facial features making up the four facial panels. Whereas the shapes of these same facial features are correlated with the emotions displayed, there appears to be no correlation between the particular emotion displayed and the sizes of the same facial features from one facial panel to the next.

Consequently, a need still remains for an innovation that will provide a more comprehensive in-depth solution to dealing with the above-described difficulties of children without introducing other problems in place thereof.

SUMMARY OF THE INVENTION

The present invention provides an educational system, method and doll for teaching individuals, particularly children, their emotions so as to overcome the potential shortcomings of prior art approaches and to fulfill the aforementioned need. The educational system, method and doll of the present invention employ a multiplicity of sets of faces that have different facial expressions displaying different emotions each with a plurality of states. Underlying the educational system, method and doll of the present invention is a recognition by the inventor herein that there are a multiplicity of emotions and for each emotion there is a plurality of states each having a different facial expression, namely, subdued, normal and exaggerated states.

Accordingly, the present invention is directed to an educational system for teaching individuals their emotions which comprises: (a) at least one and preferably a multiplicity of sets of faces; (b) each of the sets of faces being correlated with a respective one of a multiplicity of different emotions experienced by individuals from time to time; and (c) for each of the different emotions correlated with a respective set of faces, a plurality of states of the emotion are defined in the form of a different facial expression on each of the faces of the respective set thereof.

More particularly, each set of faces contains three faces. The facial expression on each face includes a plurality of facial features thereon. The facial features may include eyes, eyebrows, a mouth and a nose. The facial features of the facial expression on each of the faces of a respective set thereof differ in their relative sizes from one state to another for each emotion expressed. The facial expression on each face of the respective set thereof also includes a circle surrounding the facial features. The facial features of the facial expression on each of the faces of the respective set thereof differ in their sizes relative to the circle from one face to another of the respective set and thus from one state to another for each emotion expressed.

The present invention is also directed to an educational method for teaching individuals their emotions which comprises the steps of: (a) providing a multiplicity of different sets of faces with each set being correlated with one of a multiplicity of different emotions experienced by individuals from time to time; (b) selecting at least a pair of faces from different ones of the sets; (c) displaying the faces of the pair thereof on each of a succession of substrates; and (d) changing the faces of the pair thereof so as to switch emphasis between the faces on the succession of substrates.

More particularly, the faces are displayed on upper left and lower right diagonal portions of the substrate or one of the faces is displayed on a central portion of the substrate. The faces also are alternately displayed on successive ones of the substrates. The faces differ in size and progressively change in size from substrate to substrate.

The present invention is also directed to an educational doll providing a substrate to which selected ones of the faces can be applied. The doll comprises: (a) a body having upper and lower portions; (b) a head attached on the upper portion of the body; (c) a plurality of limbs; (d) means for attaching the limbs respectively to the upper and lower portions of the body; and (e) at least one of the limbs having a stretchable connector assembly and a limb portion attached thereto such that the connector assembly and limb portion allows the limb to be gripped and pulled away from the body and released and return back toward the body. The connector assembly includes a fan folded section connected to the limb portion and a connector strip of elastic stretchable material extending from the body through the fan folded section to the limb portion.

More particularly, the limbs include a pair of arms, one of the arms having a fan folded section therein and a pair of legs, one of the legs having a fan folded section therein. The means for attaching the limbs to the body includes complementary sets of fastening elements which are connectible to and disconnectible from one another for detachably attaching at least some of the limbs to the body.

Furthermore, at least one of the limbs and the head has a swivel element connected thereto permitting grasping of the swivel element and rotating of the doll relative to the swivel element. Also, at least one of the legs has a foot and an elastic band with a ring element attached thereto and the band secured over the foot to permit grasping of the foot via the ring element.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIGS. 15A and 15B together depict a plurality of successive stages in an emotion learning sequence employing selected ones of the faces in accordance with an educational method of the present invention for teaching individuals their emotions.

FIGS. 16A and 16B together depict a plurality of successive stages in an emotion building sequence employing selected ones of the faces in accordance with the educational method of the present invention.

FIGS. 17A and 17B together depict a plurality of successive stages in an emotion de-building sequence employing selected ones of the faces in accordance with the educational method of the present invention.

DETAILED DESCRIPTION OF THE INVENTION

Figure 1:
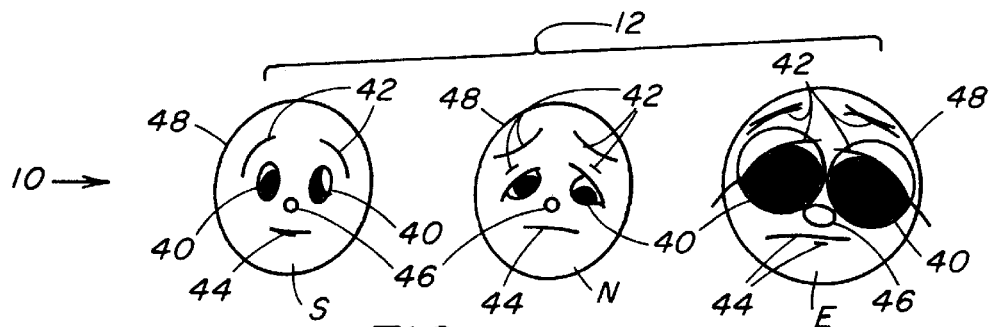
FIGS. 1 to 14 are plan views of a plurality of sets of faces having different facial expressions comprising an educational system of the present invention for teaching individuals their emotions.
Figure 2:
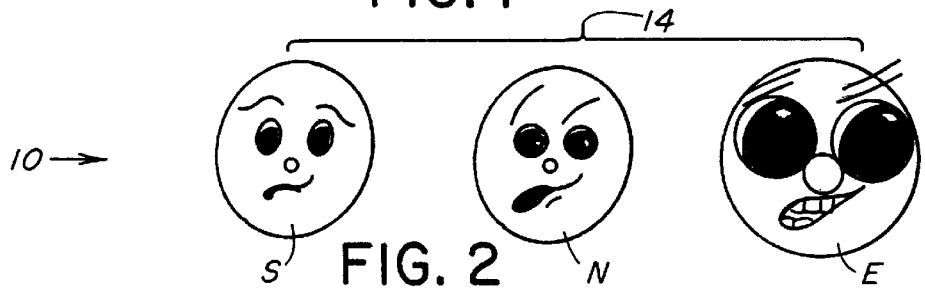
Figure 3:
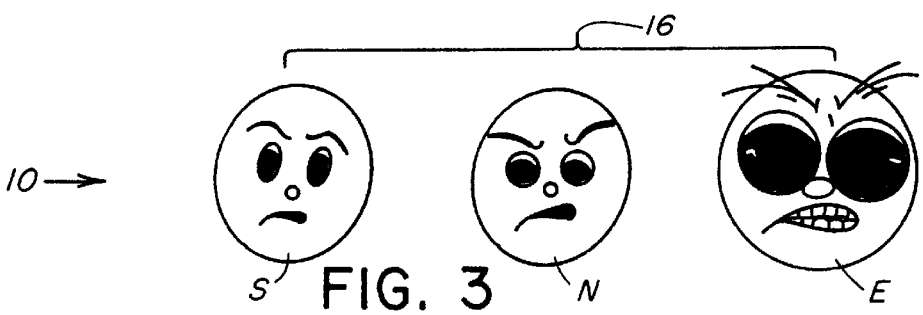
Figure 4:
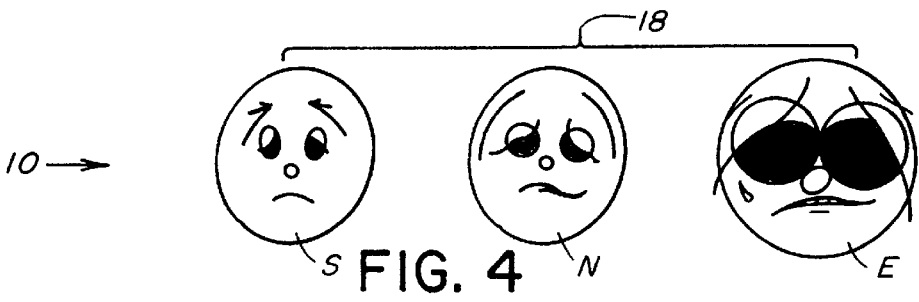
Figure 5:
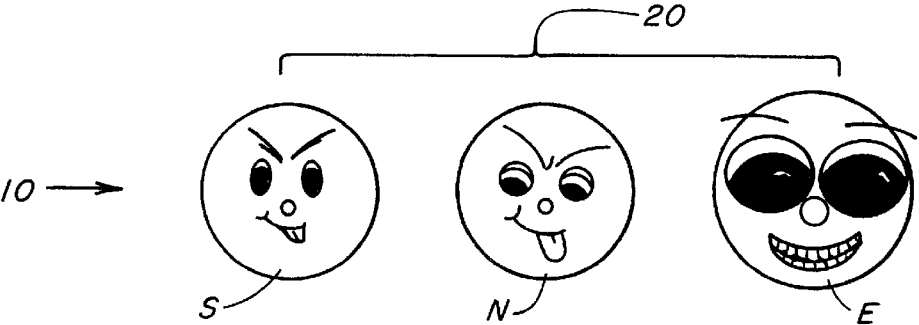
Figure 6:
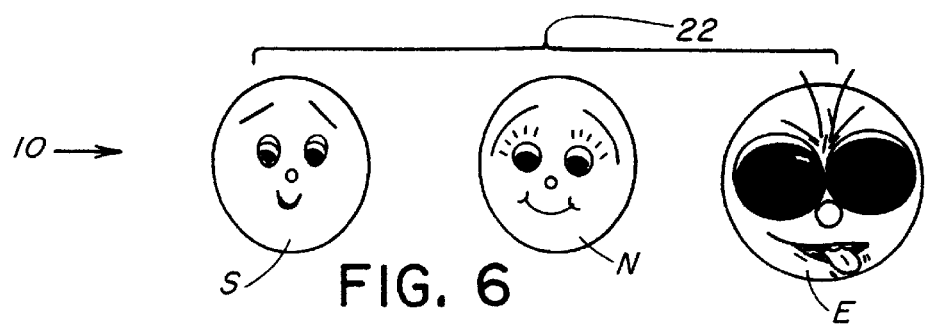
Figure 7:
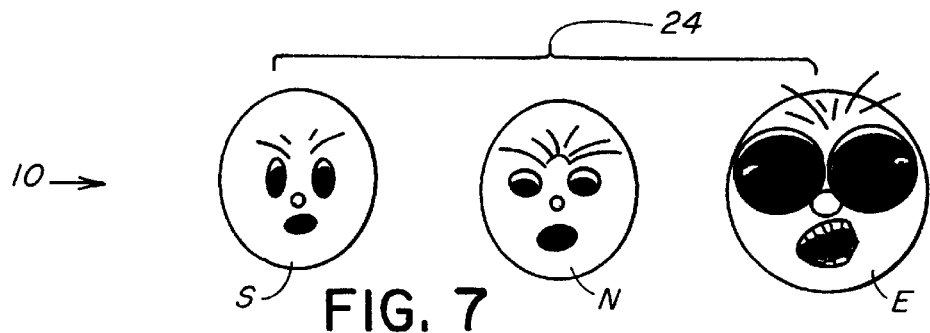
Figure 8:
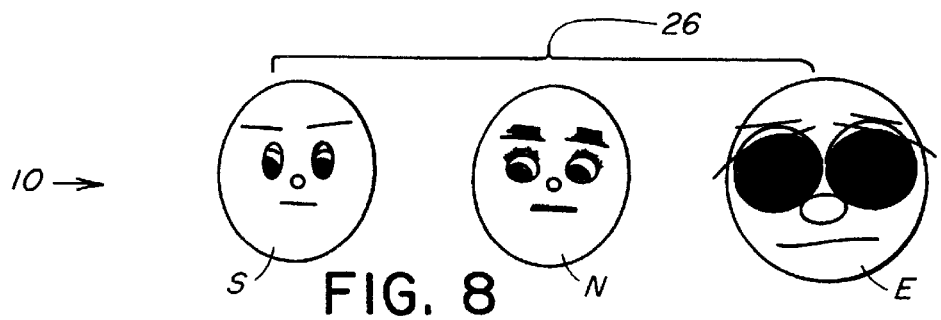
Figure 9:
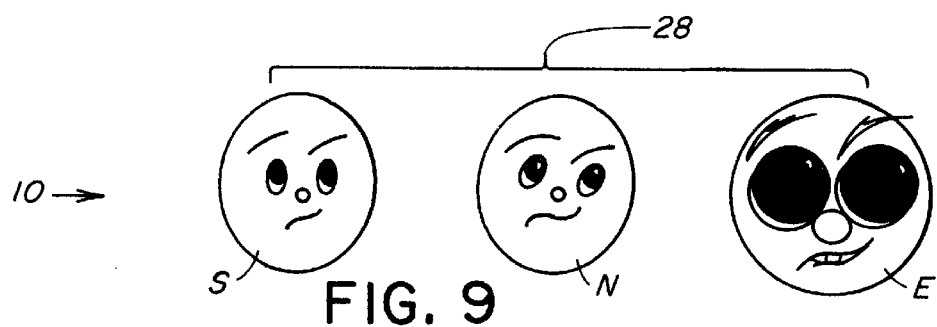

Referring to the drawings and particularly to FIGS. 1 to 14, there is illustrated an educational system of the present invention, generally designated 10, for teaching individuals their emotions. The educational system 10 basically includes a multiplicity of sets of faces having facial expressions which correlate with a multiplicity of different emotions experienced by individuals from time to time. The term "caricatured" can be used to characterize each of the faces in the sense that each face only imitates certain features of a human face and depicts those features in a deliberately exaggerated or distorted manner in order to accurately and effectively emphasis the respective emotion expressed on the particular face.

The sets of caricatured faces depicted respectively in FIGS. 1 to 14 that are identified by the following reference numerals are correlated with the different emotions listed in Table I as follows:

Table I

| Reference Numeral | Emotion |
| --- | --- |
| 12 | tired |
| 14 | afraid |
| 16 | disgusted |
| 18 | sad |
| 20 | revengeful |
| 22 | happy |
| 24 | hurt |
| 26 | frozen |
| 28 | why me |
| 30 | mad |
| 32 | crying |
| 34 | pouting |
| 36 | asleep |
| 38 | surprised |

Figure 10:
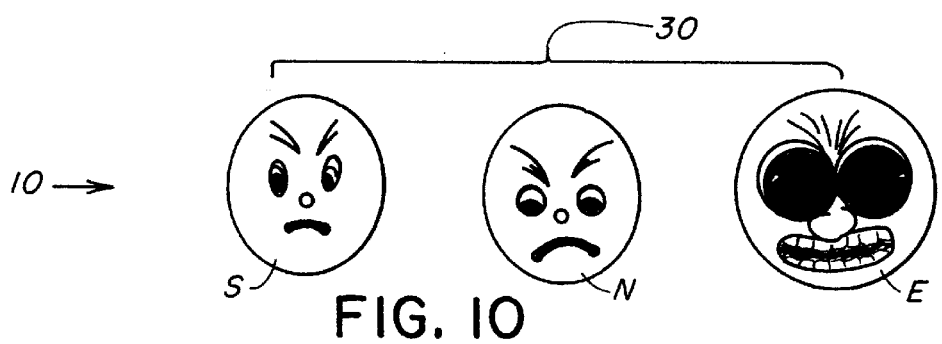
Figure 11:
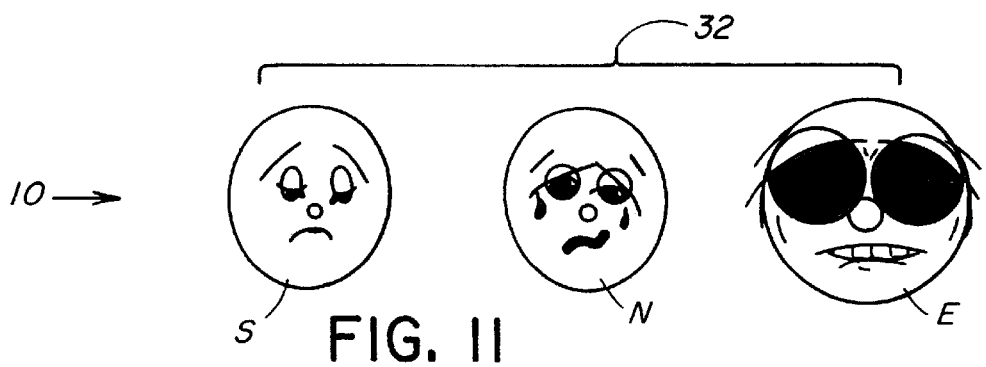
Figure 12:
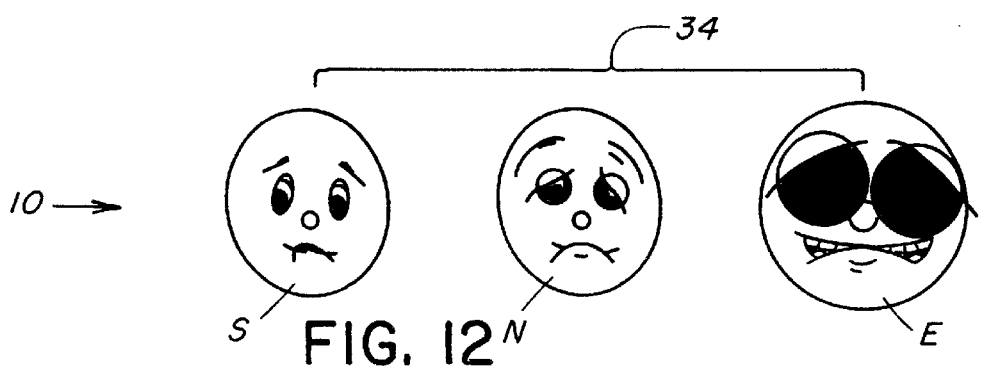
Figure 13:
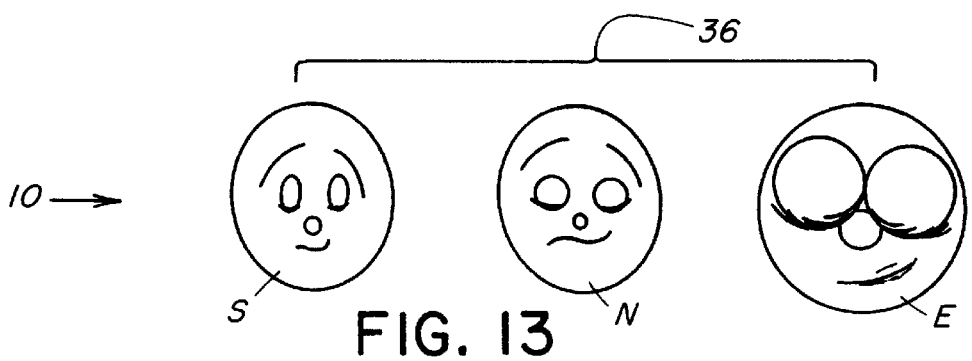
Figure 14:
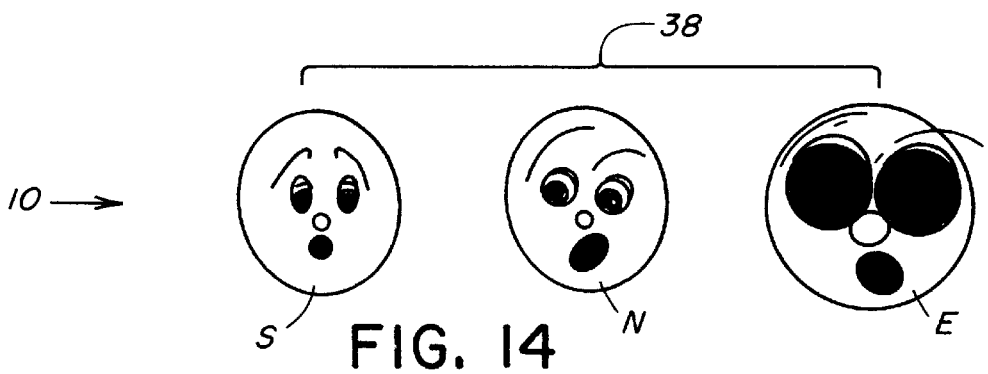

For example, the set of faces 30 in FIG. 10 contains three faces having facial expressions expressing a "mad" emotion. The above listed emotions of Table I are examples only. The present invention is not limited to just these emotions.

Also, for each emotion listed in Table I that is correlated with a-respective one of the sets of faces, 12 to 38, a plurality of different states of the emotion are defined by the facial expressions on the faces of the respective set. Preferably, there are three such states for each emotion and thus three facial expressions correlated with such states for each of the above-listed emotions. The reference letters S, N, E are used in FIGS. 1 to 14 to identify the faces of each set 12 to 38 that has facial features expressing the three states of each emotion as follows: S for "subdued"; N for "normal"; and E for "exaggerated". The reference letters S, N, E herein are combined as suffixes to the above-listed reference numerals to identify facial expressions on the faces S, N, E for the three states of each emotion. For example, the facial expression 30S refers to the face S of the set 30 which has facial features expressing a "subdued mad" emotion; the facial expression 12N refers to the face N of the set 12 which has facial features expressing a "normal tired" emotion; and the facial expression 20E refers to the face E of the set 20 which has facial features expressing an "exaggerated revengeful" emotion. The subdued, normal and exaggerated states of emotion expression can also be characterized as decreased, average and increased expressions of the particular emotion.

The facial features that are caricatured in the faces S, N, E of sets 12 to 38 to express the particular emotions are eyes 40, eyebrows 42, a mouth 44 and a nose 46. These facial features are enclosed in a circle 48 which is the boundary of the face S, N, E. For the sake of clarity in the depiction of the faces S, N, E of the different sets 12 to 38 thereof in FIGS. 1 to 14, the identifying reference numerals 40 to 48 of the facial features and the facial circle are only shown in FIG. 1. Also, as can be understood in FIGS. 1 to 14, the relative sizes of these facial features to the facial circles change from one state to another for each emotion expressed. In particular, for each emotion expressed, the sizes of these facial features in relation or proportion to the size of the facial circle are smallest in the subdued state, largest in the exaggerated state, and inbetween, and in proportion or balance with the size of the facial circle, in the normal state. Also, in the subdued state facial expressions, the eyes 40 are more oval shaped. In the normal state facial expressions, the eyes 40 are more round shaped. In the exaggerated state facial expressions, the eyes 40 are large, round, darkened and take up most of the space of the facial circle 48.

The use of the faces S, N, E of the sets 12 to 38 thereof as depicted in FIGS. 1 to 14 in teaching individuals their emotions is most effective when the faces are applied on a substrate. Examples of various different suitable substrates are dolls, masks, sheets of paper, and any other flat media.

Referring now to FIGS. 15A–15B, 16A–16B and 17A–17B, there are illustrated learning, building and de-building sequences used to assist and guide individuals in learning about, expressing and modifying their emotions. These sequences have various stages that carry out various steps of an educational method of the present invention wherein selected faces having different facial expressions correlated with the different states of emotions are employed. In all of the illustrated sequences, a pair of faces selected from different sets thereof are displayed on a succession of substrates 50, for example sheets of letter size paper.

In the learning sequence of FIGS. 15A–15B, faces having facial expressions 18S and 22N are displayed. The face 18S expresses a "subdued sad" emotion whereas the face 22N expresses a "normal happy" emotion. In the building sequence of FIGS. 16A–16B, faces having facial expressions 18N and 22S are displayed. The face 18N expresses a "normal sad" emotion whereas the face 22S expresses a "subdued happy" emotion. In the de-building sequence of FIGS. 17A–17B, faces having facial expressions 18E and 22S are displayed. The face 18E expresses an "exaggerated sad" emotion whereas the face 22S expresses a "subdued happy" emotion.

In all of the sequences there are stages included where the faces are changed so as to switch emphasis between the faces on the succession of substrates 50. In the learning and building sequences of FIGS. 15A–15B and 16A–16B, the faces are displayed on diagonal portions of the substrates 50 and, particularly, in opposing upper left and lower right portions of the substrates 50. Because individuals are taught to read from left to right, the upper left face will ordinarily be the first one encountered by the individual. The face in the upper left portion of a first substrate 50 is substantially smaller in size than the other face displayed in the lower right portion of the first substrate. The smaller size of the upper left face makes it much less fearful to the individual being taught than the larger lower right face. In the stages of the learning sequence of FIGS. 15A–15B, the upper left face 18S progressively increases in size, for example 20% on some of the successive substrates 50, in going from the first to last substrate 50 whereas the lower right face 22N progressively decreases in size, for example 20% on some of the successive substrates 50, in going from the first to last substrate 50. In the stages of the building sequence of FIGS. 16A–16B, the upper left face 18D and lower right face 22S progressively increase in size, for example 20% on some of the successive substrates 50, in going from the first to eighth substrates 50. In the de-building sequence of FIGS. 17A–17B, the one face 18S is displayed on a central portion of the substrate 50.

The learning, building and de-building sequences of FIGS. 15A–15B, 16A–16B and 17A–17B are just a few of the many sequences in which faces from the sets thereof of FIGS. 1 to 14 can be employed in accordance with the teaching method of the present invention to teach individuals their emotions.

Figures 18, 19:
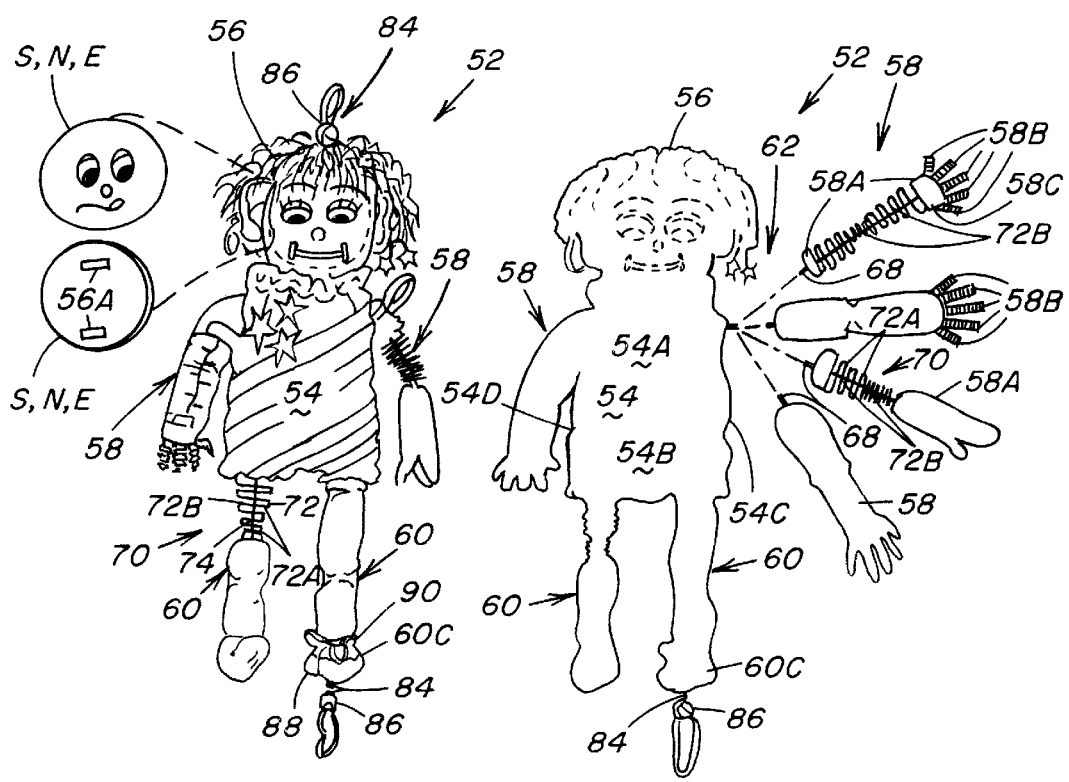
FIG. 18 is a front elevational view of an educational doll providing one form of a substrate to which selected ones of the faces can be applied.
FIG. 19 is another front elevational view of the doll showing different forms of the arms which can be detachably attached to the body of the doll.
Figures 20, 21:
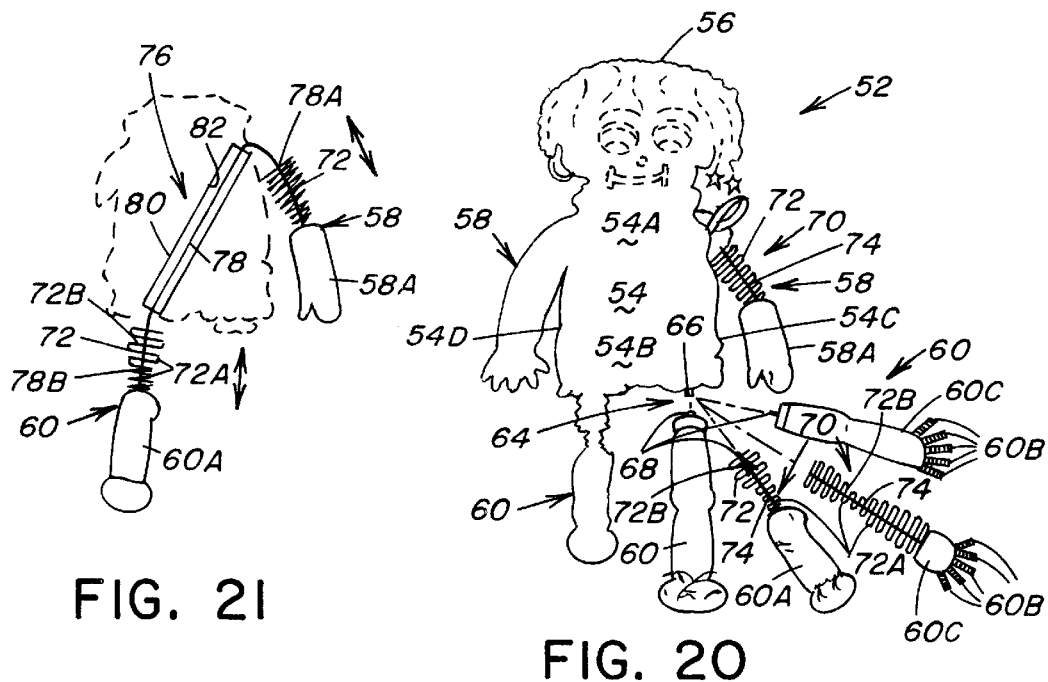
FIG. 20 is another front elevational view of the doll showing different forms of the legs which can be detachably attached to the body of the doll.
FIG. 21 is a fragmentary view of the doll showing an elastic connection between an arm and a leg of the doll which are disposed diagonally across the body from one another.

Referring now to FIGS. 18 to 20, there is illustrated an educational doll, generally designated 52, providing one form of the substrate 50 to which selected ones of the faces S, N, E of the sets 18 to 38 thereof can be applied. The doll 52 includes a plurality of body parts, preferably, a trunk or body 54, a head 56, and a plurality of limbs preferably in the form of a pair of arms 58 and a pair of legs 60. The body 54 has upper and lower portions 54A, 54B and opposite lateral sides 54C, 54D. The head 56 is attached on the upper portion 54A of the body 54. The head 56 is adapted to have a selected one of the faces S, N, E of the different sets 12 to 38 thereof, being in a pancake-like flat form, detachably and interchangeably applied to a front surface of the head 56 in any suitable manner, such as by use of complementary hook and loop fastening material 56A. Also, the doll 52 can be provided with patches of loop fastening material thereon so that the faces S, N, E can be placed at various locations on the doll. The doll 52 also includes means 62 for detachably attaching the arms 58 to the opposite sides 54C, 54D of the body 54 at the upper portion 54A thereof and adjacent to opposite lateral sides of the head 56. The doll 52 further includes means 64 for attaching the legs 60 to the lower portion 54B of the body 54 at locations adjacent to the opposite sides 54C, 54D of the body 54 such that each of the legs 60 adjacent to one of the opposite sides 54C, 54D of the body 54 is disposed diagonally across the body from one of the arms 58 at the other of the opposite sides 54C, 54D of the body 54. The means 62, 64 for respectively attaching each of the arms 58 and legs 60 to the body 54 includes complementary sets of fastening elements 66, 68 which are connectible to and disconnectible from one another for detachably attaching the respective arms 58 and legs 60 to the body 54. The fastening elements 66, 68 can take any suitable form such as conventional snaps, patches of hook and loop fasteners and the like. Alternatively, some or all of the arms 58 and legs 60 can be permanently attached to the body 54, such as by being sewn thereto.

FIGS. 19 and 20 respective show different forms of the arms 58 and legs 60 which can be detachably attached to the body 54 of the doll 52. Some of the forms of the arms and legs 58, 60 respectively include arm and leg portions 58A, 60A and stretchable connector assemblies 70 attached thereto to allow the arm and leg portions 58A, 60A to be gripped by a child and pulled away from the body 54 and then released so that the arm and leg portions 58A, 60A return back toward the body 54. The stretchable connector assemblies 70 include fan folded sections 72 connected between the body 54 and respective arm and leg portions 58A, 60A. By the use of patches of hook and loop material applied thereon, the fan folded sections 72 are adapted to hold various objects, such as the faces, on top of or between the folds. Optionally, connector strips 74 of stretchable material can be provided attached to and extending from the body 54 through the fan folded sections 72 to the arm and leg portions 58A, 60A. Fingers 58B of hands 58C on the arms 58 and toes 60B of feet 60C on the legs 60 can also be in the form of the fan folded sections. As shown in FIGS. 19–21, each fan folded section 72 includes a plurality of segments 72A connected in sucession one to another to define a serpentine configuration in which the segments 72A are foldable toard and unfoldable away from one another so as to permit corresponding movement of the respective limb (arm 58 or leg 60) toward and away from the body 54 of the doll 52. Furthermore, the segments 72A of each section 72 having apertures 72B defined therein through which the respective connector strip 74 of material extends from a first to a last of the segments 72A such that the segments 72A are disposed along the strip 74.

FIG. 21 shows a modified embodiment of the stretchible connector assembly, generally designated 76 extending between an arm 58 and a leg 60 of the doll 52 which are disposed diagonally across the body 54 from one another. Preferably, the modified connector assembly 76 includes a pair of the fan folded sections 72 with one being disposed in the one arm 58 and the other being disposed in the one leg 60 disposed diagonally across the body 54 from the one arm 58. The modified connector assembly 76 also includes an elongated connector strip 78 of material at least portions of which are stretchable, the connector strip 78 extending diagonally across the body 54, such as exteriorly along a back thereof, and having opposite end portions 78A, 78B which can be the stretchible portions extending through the fan folded sections 72 and attached to respective arm and leg portions 58A, 60A of the arm and leg 58, 60 so as to allow the diagonally disposed arm and leg portions 58A, 60A to be gripped and pulled away from the body 54 and released and then returned back toward the body 54. The modified connector assembly 76 also includes a cover strip 80 of material attached to the body, such as the exterior back portion of the body 54 so as to define a passageway 82 along the body 54 with the connector strip slidably extending therethrough.

Further, at least one of the legs 60 and the head 56 has a swivel element 84 connected thereto with a ring element 86 to permit grasping of the swivel element 84 by a child and rotating of the doll 52 relative to the swivel element 84 by the child. Also, the swivel elements 84 can be provided on clothing worn by the doll 52 and adapted to have objects, such as the faces S, N, E mounted to the swivel elements 84.

Still further, at least one of the feet 60C of the legs 60 has an elastic band 88 with a ring element 90 attached thereto. The elastic band 88 is secured over the one foot 60C so as to permit grasping of the foot 60C via the ring element 90 on the elastic band 88. The elastic band 88 could also be secured over the hand 58C of an arm 58.

The fan folded sections 72, ring element 90 and swivel elements 84 on the doll 52 variously permit a child to decorate the doll 52 with objects and to make the doll 52 dance, turn or spin as the child holds the doll 52, thereby allowing a child to have fun with the doll 52 while learning his or her emotions.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An educational doll, comprising:
    (a) a body having upper and lower portions;
    (b) a head attached on said upper portion of said body;
    (c) a plurality of limbs; and
    (d) means for attaching individual ones of said limbs respectively to said body at a said upper and lower portions thereof, said means for attaching including at least one stretchable connector assembly attached between said body and said limb so as to allow said limb to be gripped and pulled away from said body and released and returned back toward said body, said stretchable connector assembly having a fan folded section extending between and interconnecting said body and said limb and an elongated connector strip of material disposed through said fan folded section, said fan folded section including a plurality of segments connected in succession one to another to define a serpentine configuration in which said segments are folded toward and unfoldable away from one another so as to permit corresponding movement of said limb toward and away from said body, each of said segments having an aperture defined therein through which said elongated connector strip of material extends from a first to a last of said segments such that said segments are disposed along said elongated connector strip of material.

2. The doll of claim 1 wherein said fan folded section is adapted to have applied thereon at least a selected one of a multiplicity of different faces correlated with one of a multiplicity of different emotions experienced by individuals.

3. The doll of claim 1 wherein said limbs include a pair of arms, one of said arms having said fan folded section therein.

4. The doll of claim 1 wherein said limbs include a pair of legs, one of said legs having said fan folded section therein.

5. The doll of claim 1 wherein said means for attaching further includes at least one set of fastening elements, said fastening elements being connectible to and disconnectible from one another for detachably attaching at least one of said limbs to said body.

6. The doll of claim 1 wherein at least one of said limbs and said head has a swivel element connected thereto permitting grasping of said swivel element and rotating of said doll relative to said swivel element.

7. The doll of claim 1 wherein said limbs include a pair of legs, one of said legs having a foot and an elastic band with a ring element attached thereto and said band being secured over said foot to permit grasping of said foot via said ring element.

8. The doll of claim 1 wherein said head has a surface adapted to have applied thereon a selected one of a multiplicity of different faces correlated with one of a multiplicity of different emotions experienced by individuals.

9. The doll of claim 8 wherein said faces have a flat form and are detachably and interchangeably applied to a front surface of the head.

10. An educational doll, comprising:
    (a) a body having upper and lower portions and opposite lateral sides;
    (b) a head attached on said upper portion of said body;
    (c) a pair of arms;
    (d) a pair of legs; and
    (e) means for attaching said individual ones of said arms respectively to said opposite sides of said body at said upper portion thereof and adjacent to opposite lateral sides of said head and for attaching individual ones of said legs respectively to said lower portion of said body at locations adjacent to said opposite sides of said body such that each of said legs at one of said opposite sides of said body is disposed diagonally across said body from one of said arms at the other of said opposite sides of said body, said means for attaching including at least one connector assembly having a pair of fan folded sections and an elongated connector strip of material having opposite end portions disposed through said fan folded sections, one of said fan folded sections extending between and interconnecting said body and one of said arms and the other of said fan folded sections extending between and interconnecting said body and one of said legs disposed diagonally across said body from said one arm, each of said fan folded sections including a plurality of segments connected in succession one to another to define a serpentine configuration in which said segments are foldable toward an unfoldable away from one another so as to permit corresponding movement of said respective arm and leg toward and away from said body, each of said segments having an aperture defined therein through which one of said opposite end portions of said elongated connector strip of material extends from a first to a last of said segments such that said segments are disposed along said elongated connector strip of material, at least portions of said elongated connector strip of material being stretchable, said elongated connector strip of material being further extending diagonally across said body between said opposite end portions of said elongated connector strip of material which extend through said fan folded sections between said body and respective diagonally disposed arm and leg and attached to said respective arm and leg so as to allow said diagonally disposed arm and leg to be gripped and pulled away from said body and released and returned back toward said body.

11. The doll of claim 10 wherein said connector assembly further includes a cover strip of material attached to an exterior portion of said body so as to define a passageway along said body with said connector strip slidably extending therethrough.

12. The doll of claim 10 wherein said means for attaching said arms to said body and said legs to said body further includes sets of fastening elements, said fastening elements being connectible to and disconnectible from one another for detachable attaching at least one of said arms and one of said legs to said body.

13. The doll of claim 10 wherein at least one of said legs and said head has a swivel element connected thereto permitting grasping of said swivel element and rotating of said doll relative to said swivel element.

14. The doll of claim 10 wherein at least one of said legs having a foot and an elastic band with a ring element attached thereto and said band being secured over said foot so as to permit grasping of said foot via said ring element.

15. The doll of claim 10 wherein said head has a surface adapted to have applied thereon a selected one of a multiplicity of different faces correlated with one of a multiplicity of different emotions experienced by individuals.

16. The doll of claim 15 wherein said faces have a flat form and are detachably and interchangeably applied to a front surface of the head.

* * * * *